May 30, 1933.　　　　E. C. BOPF　　　　1,912,031
TRACTOR
Filed Nov. 19, 1931　　　4 Sheets-Sheet 1

INVENTOR
Edward C. Bopf

WITNESS
Walter Ackerman

May 30, 1933.　　　　　E. C. BOPF　　　　　1,912,031
TRACTOR
Filed Nov. 19, 1931　　　4 Sheets-Sheet 3
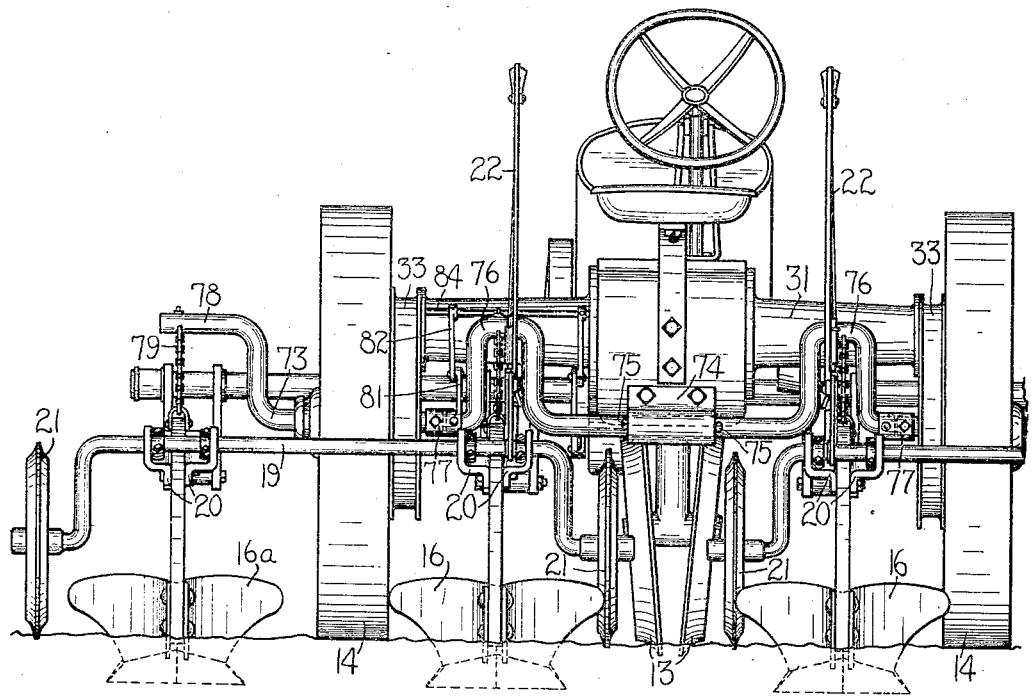
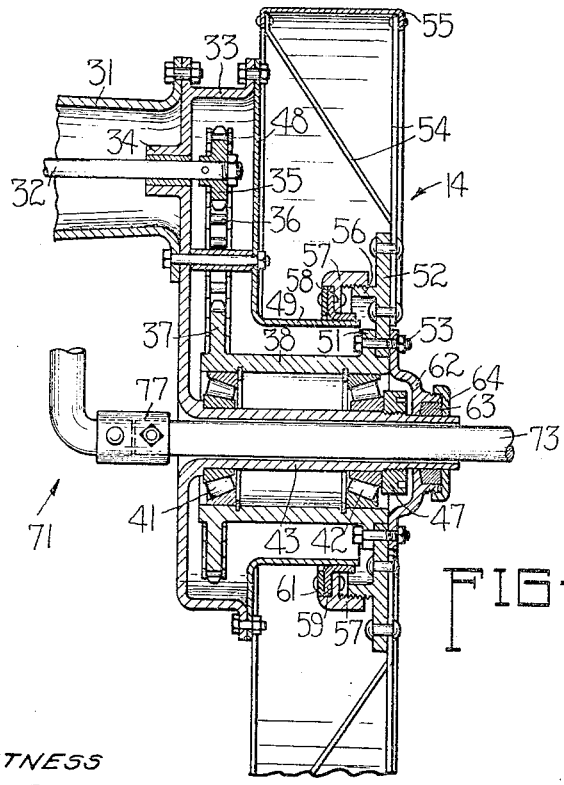
FIG-3
FIG-4
INVENTOR
Edward C Bopf
WITNESS
Walter Ackerman May 30, 1933.  E. C. BOPF  1,912,031
TRACTOR
Filed Nov. 19, 1931   4 Sheets-Sheet 4

WITNESS
Walter Ackerman

INVENTOR.
Edward C Bopf

Patented May 30, 1933

1,912,031

UNITED STATES PATENT OFFICE

EDWARD C. BOPF, OF MOLINE, ILLINOIS, ASSIGNOR TO DEERE & COMPANY, OF MOLINE, ILLINOIS, A CORPORATION OF ILLINOIS

TRACTOR

Application filed November 19, 1931. Serial No. 575,993.

My invention relates to tractors and particularly to tractors adapted to carry farm implements. The main object of the invention is the provision of a tractor having hollow spindles for the rear drive wheels thereof, whereby power may be transmitted therethrough to raise and lower or operate the mechanism of the implement carried by the tractor.

Agricultural implements such as planters, listers, etc., which are adapted to be used with a tractor, are frequently supported on the tractor frame and are raised from an operative to an inoperative position by power supplied by the tractor motor. Tractor supported implements of this kind, when designed to operate on three or four rows of crop at one time, are usually of such width as to extend laterally beyond each side of the tractor, and, for lifting purposes, it is usual to provide a transversely disposed lifting shaft extending above and across the units of the implement and supported on a specially provided frame mounted on the tractor at the rear of the drive wheels. This frame adds considerable weight to the implement and incidentally adds to the cost thereof.

One of the important objects of my invention, therefore, is to eliminate the excess weight and cost of a supporting frame for the lifting shaft or drive shaft and I accomplish this by providing hollow spindles for the rear drive wheels of the tractor, and supporting the transverse lifting shaft in the hollow spindles.

In certain implements it is necessary to transmit power to the individual units themselves. In a corn planter for example it is necessary to transmit power to the seed selecting mechanism of each unit. Another object of my invention is to provide means for transmitting power to each unit, including a drive shaft also extending through the hollow spindles for transmitting power to the outer units. In the latter arrangement, I prefer to make the drive shaft of tubing, and to journal the lifting shaft within the tubing.

Other objects and advantages of my invention will be apparent to those skilled in the art after a consideration of the following detailed description, taken in conjunction with the accompanying drawings wherein:

Figure 3 is a rear elevational view of Figure 1;

Figure 4 is an enlarged detail view taken on the plane of line 4—4 of Fig. 2;

Figure 1:
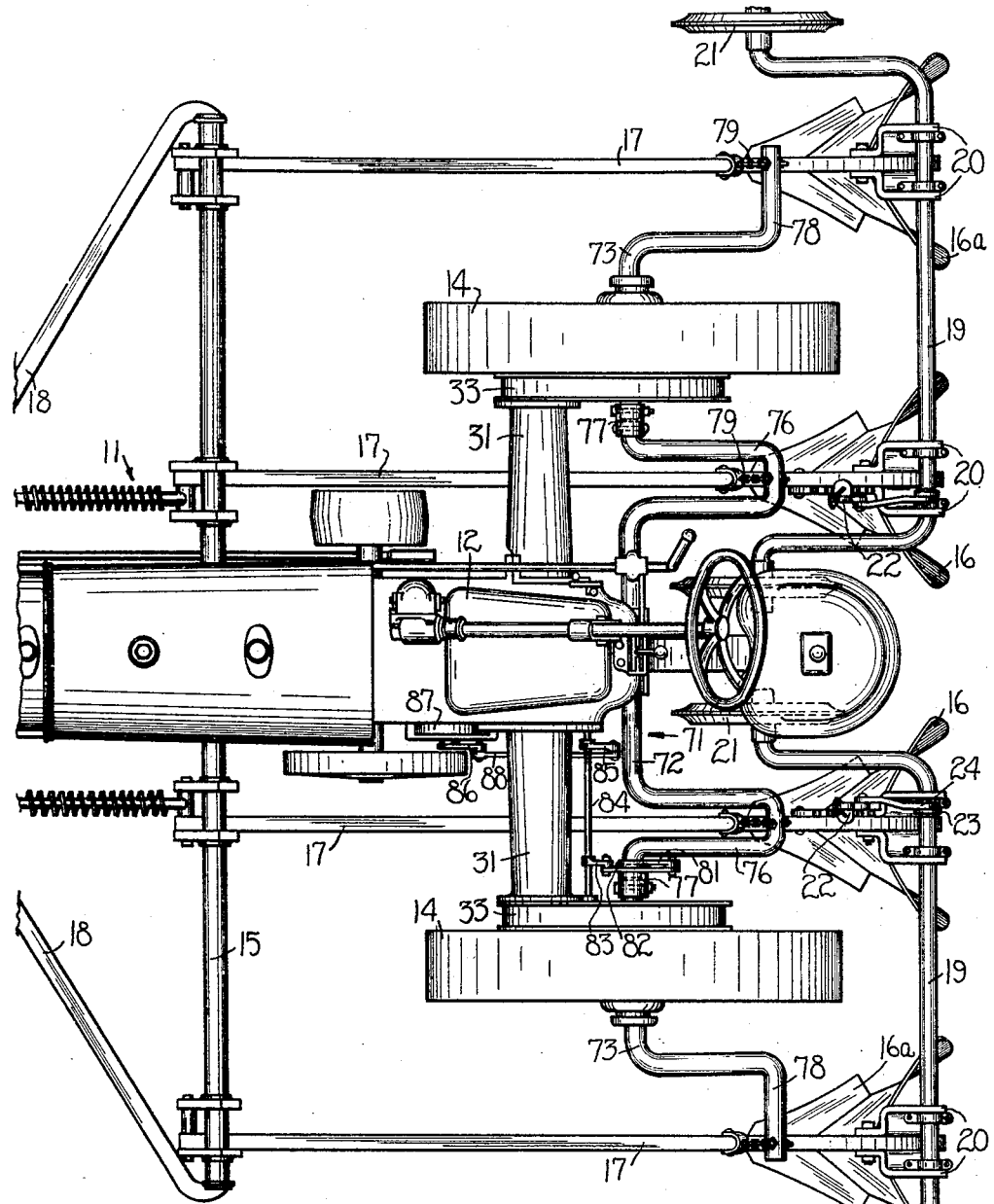
Figure 1 is a top plan view of a tractor having a plurality of listing plow units positioned at the rear thereof and showing the transverse lifting shaft extending through and journaled in the spindles of the rear tractor wheels.
Figure 2:
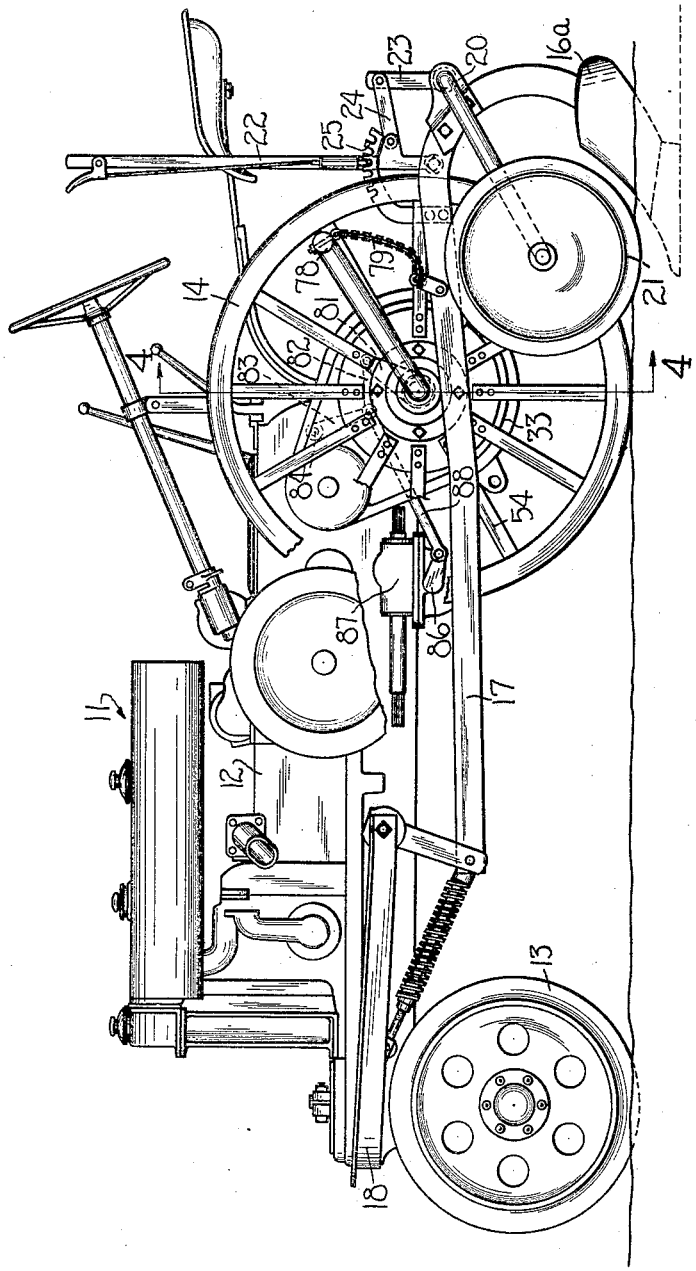
Figure 2 is a side elevational view of the mechanism shown in Fig. 1.

Referring to Figures 1 to 4 inclusive of the drawings, the tractor 11 comprises the body portion 12 which is supported at the front end on steering wheels 13 and at the rear end on drive wheels 14. A transversely disposed drawbar 15 is supported in the body portion 12 of the tractor and extends laterally from each side thereof. A plurality of listing plow units are equidistantly spaced at the rear of the tractor and comprise listing plows 16 located between the tractor drive wheels and a listing plow 16a located outside each tractor drive wheel. A plow beam 17 extends forwardly from each plow 16 and 16a and has a pivotal connection with the drawbar 15. The drawbar 15 is braced against rearward bending by means of diagonally disposed braces 18 which converge forwardly from the ends of the drawbar and are connected to the body portion 12 of the tractor. The plows 16 and 16a are arranged in transverse alignment, the points of the plows being positioned forwardly of the rearmost point of the drive wheels. A rocking axle 19, having a crank formed at each end thereof, is provided for each right and left hand pair of listing plows and each axle 19 is supported in brackets 20 secured to the plow beams. Each right and left hand pair of listing plows comprise an outer plow unit 16a and an adjacent plow unit 16 which is positioned inwardly of the tractor drive wheel.

A depth adjusting wheel 21 is journaled on each crank of the axles 19. A hand lever 22 is pivotally mounted on the inner plow beam of each pair of listing plows and is connected to an arm 23 secured to the respective axle by means of a link 24. The listing plows are retained in any desired depth by means of a latch dog on the lever engaging a ratchet 25 secured on the plow beam.

A quill 31 extends laterally from each side of the body portion 12 of the tractor adjacent the rear end thereof and encloses a drive shaft 32 which has driving engagement with a differential mechanism located within the body portion 12. A chain housing 33 is secured to the outer end of each quill 31 and inclines downwardly and rearwardly. A bearing 34 is formed integral with each chain housing 33 and serves to support the outer end of the drive shaft 32. The drive shaft 32 extends beyond the bearing 34 and a sprocket 35 is secured on the end thereof. A drive chain 36 has driving engagement with the sprocket 35 and is also trained over a sprocket 37 formed integral with the inner end of a sleeve 38. The sleeve 38 is supported on antifriction bearings 41 and 42 which are mounted on a hollow spindle 43 extending outwardly from and formed integral with the chain housing 33. Bearings 41 and 42 may be adjusted by means of a lock nut 47 which engages a threaded portion of the spindle 43.

A plate 48 encloses the outer face of the chain housing 33 and a cylindrical portion 49 is formed integral therewith and is disposed around the sleeve 38. A flange 51 is formed integral with the sleeve 38 adjacent the outer end thereof which forms the means by which the tractor wheel 14 is fixed to sleeve 38. The hub of wheel 14 comprises a ring 52, and is secured to flange 51 by means of bolts 53. Spokes 54 are riveted or otherwise secured to the ring 52 and radiate outwardly and are connected to the rim 55 of the drive wheel 14. A horizontally disposed circular flange 56 extends inwardly from the ring 52 and is formed integral therewith. The flange 56 is threaded to receive the threaded portion of a collar 57. An inwardly disposed flange 58 is formed adjacent the opposite end of the collar, and an oil retaining ring 59, of leather or similar material, is secured between the flange 58 and a washer 61, the retaining ring 59 being bent over so as to contact with the cylindrical portion 49. A collar 62 is placed over the end of the spindle 43 and is securely held against the ring 52 by the bolts 53. A recess formed in the collar 62 receives a felt washer 63 which is held in place by a cap 64 which is screwed over the end of collar 62.

The lifting mechanism for lifting the plows to inoperative position includes a transversely disposed rock shaft 71 comprising a central member 72 and an outer member 73 connected to each end thereof. A bracket 74 is secured to the rear end of the body portion 12 of the tractor and the central member 72 of the rock shaft 71 is supported therein intermediate its ends. A cotter pin 75 is provided in the central member 72 at each side of the bracket 74 to maintain the central member in proper position. A crank 76 is formed in the member 72 at each side of the bracket 74 and each crank aligns with an adjacent beam 17. The central member 72 terminates inside the inner face of the chain housing 33 and a sleeve 77 is secured to each end thereof. The outer members 73 of the rock shaft 71 extend through the sleeve 43 of the respective drive wheels and are secured to the sleeves 77. A crank 78 is formed on each member 73 aligning with a respective outer beam 17. A chain or other flexible means 79 is secured to each crank 76 and 78 and extends downwardly and has a connection with the aligned beam 17. An arm 81 is formed integral with the left hand sleeve 77 and a link 82 extends forwardly from a pivotal connection with this arm and has a similar connection with an arm 83 secured on an intermediate rock shaft 84. An arm 85 is also secured to the shaft 84 and is connected with the arm 86 of the power lift mechanism 87 by a link 88. The power lift mechanism may be of any suitable type operable by power derived from the tractor motor, preferably such as is disclosed in the application of Brown and Murray, Serial Number 399,980, filed October 16, 1929.

When the listing plows are set in operating position the rock shaft 71 is rocked downwardly so that the lifting chains 79 hang slack and permit the plows to work at the depth determined by the gage wheels 21. When the plows are to be raised, as for transport, the tractor power lift 87 is set in gear and through the connecting lifting mechanism the rock shaft 71 is rocked so as to lift the cranks 76 and 78 which in turn lift the beams 17 of the plows 16 and 16a. By extending the rock shaft through the spindles of the rear drive wheels of the tractor a supplemental supporting frame is not required thereby eliminating weight from the implement and reducing the cost thereof.

Figure 5:
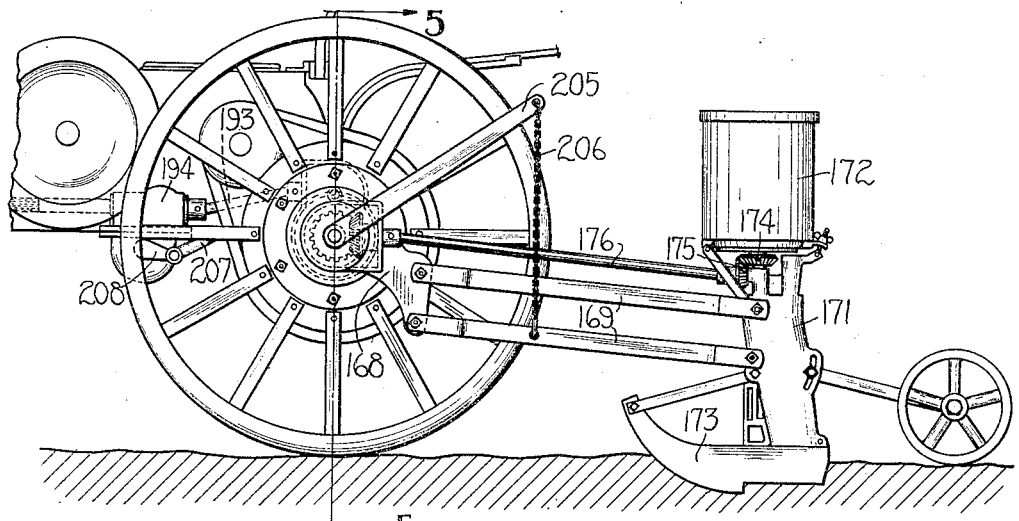
Figure 5 is a side elevational view of a modification of my improved device as applicable to a multi-row corn planter, wherein a drive shaft for driving the individual planting units is provided which extends through and is journaled in the spindle of the rear tractor wheels, and which is formed of tubular stock to accommodate the lifting rock shaft.
Figure 6:
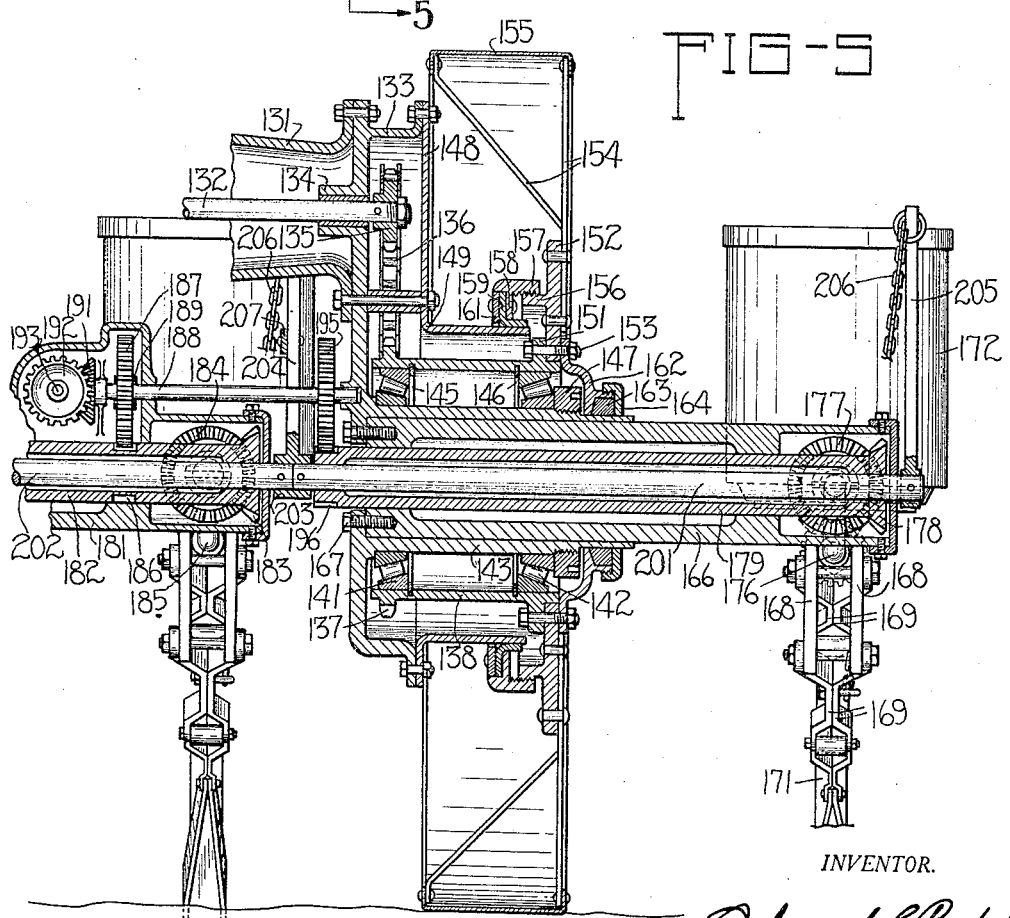
Figure 6 is an enlarged detail view of the modified form taken on the plane of line 6—6 of Figure 5.

Figures 5 and 6 of the drawings illustrate a modified form of my invention which makes it applicable to a four row planter. In this type of implement the planter units are raised and lowered through the rocking action of a transverse rock shaft which is journaled within a tubular rotating drive shaft provided for driving the seed selecting mechanism of the planter units, both of which extend through the hollow spindles of the rear tractor wheels. The planter disclosed in Figures 5 and 6 comprises four planting units, each unit being positioned with respect to the tractor substantially the same as the plows 16 and 16a of the disclosure of Figures 1 to 4. In Fig. 6 only two of the four units are illustrated, the other two units being substantial duplicates thereof. The rear wheel mounting for the tractor and the drive thereto is similar to that shown in Fig. 4, except that certain parts have been made larger to provide a larger central opening in the hollow spindle. Corresponding parts have been given similar numbers with the hundred digit added.

The outer unit shown in Figures 5 and 6 is connected with the tractor by means of a housing 166 secured by means of bolts 167 in the hollow spindle 143 and extends laterally therefrom. A pair of spaced parallel clevis members 168 are formed on the outer end of the housing 166 and pivotally connected to each clevis member is a pair of rearwardly extending draft bars 169. The rear end of the draft bars 169 is pivotally connected to a planter shank 171 which supports a seed hopper 172 at its upper end and a furrow opener or boot 173 at its lower end. The usual seed selecting mechanism is provided in the bottom of the seed hopper and a bevel gear 174 is connected with this mechanism and meshes with a bevel gear 175 fixed on the rear end of a drive shaft 176. A bevel gear 177 is secured to the opposite end of the shaft 176 and meshes with a gear 178 formed integral with the outer end of a rotating driving shaft which is in the form of a tube or sleeve 179 which is journaled in the housing 166. A similar housing and driving sleeve also extends laterally from the opposite tractor drive wheel.

A housing 181 is provided between the wheels and aligns with the laterally extending housing 166. A driving sleeve 182 is journaled in the housing 181 and a bevel gear 183 is formed on the end thereof and meshes with a bevel gear 184 which is secured on the driving shaft 185, which drives the seed selecting mechanism of the inner unit shown in Figures 5 and 6. Gear teeth 186 are formed in sleeve 182 with which a gear 187 which is fixed on a shaft 188 meshes. The gear 187 is driven by a spur gear 189 which is secured to one end of a short shaft, having a bevel gear 191 fixed on its opposite end and having driving engagement with a bevel gear 192 mounted on a shaft 193 which extends forwardly to the power take-off 194 of the tractor.

One end of the shaft 188 is journaled in the upper portion of housing 181. Its other end is journaled in a bearing recess provided in the inner side of housing 133. Adjacent this end a gear 195 is secured to the shaft which meshes with gear teeth 196 formed on the inner end of the driving sleeve 179. A similar driving connection is provided between the opposite end of the centrally disposed driving sleeve and the adjacent end of the laterally extending sleeve. By this driving arrangement each of the seed feeding mechanisms are driven by the tractor motor.

The outer section 201 of the transverse lifting rock shaft is journaled in the sleeve 179 and the central section 202 is journaled in the sleeve 182. The adjacent ends of the rock shaft sections are secured together by means of a collar 203 having a lifting arm 204 formed integral therewith and inclining rearwardly therefrom. A lifting arm 205 is secured to the outer end of the rock shaft section 201 and disposed in the same plane as arm 204. A rock shaft section (not shown) is provided at the opposite side of the tractor and similar lifting arms are attached to this shaft. These lifting arms are disposed on a plane with the longitudinal center line of the planter units and a chain or other flexible means 206 extends downwardly from each arm and connects with a draft bar of the respective planter unit.

A link 207 extends forwardly from one of the lifting arms 204 to a connection with a power lift crank 208 which is operated by the power lift mechanism on the tractor. By reason of the flexible connections 206 the planter units are raised and lowered by the action of the lifting arms.

From the foregoing description of the listing plow and the planter it will be apparent that by supporting the listing and driving shafts of the implement in the hollow spindles of the tractor drive wheels, the usual shaft supporting frame may be dispensed with, thereby providing a more compact construction. My improved supporting means may also be used with other agricultural implements in which a drive or lifting power is provided by the tractor and is not, therefore, confined to use with the listing plow and the planter shown and described.

While I have described in connection with the accompanying drawings the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. The combination with a tractor comprising a frame, a hollow spindle at each side of the frame, and traction wheels journaled on the hollow spindles, of a ground engaging implement carried by the tractor including draft beams extending longitudinally thereof along the outer side of the traction wheels, a transverse rock shaft journaled in and extending through the hollow spindles, arms on said shaft connected with said beams, and means for rocking said shaft to raise the implement out of operating position.

2. The combination with a tractor comprising a frame, a hollow spindle at each side of the frame and traction wheels journaled on the hollow spindles, of a ground engaging implement carried by the tractor and extending laterally beyond the outer edge of the wheels, and a transverse rock shaft comprising a central member journaled on the tractor and an outer member secured to each end of and supported in the adjacent hollow spindle, arms on said shaft connected with said implement, and means for rocking said shaft to raise the implement out of operating position.

3. The combination with a tractor comprising a body portion, a hollow spindle at each side of the body portion and traction wheels journaled on the hollow spindles, of a ground engaging implement carried by the body portion and extending laterally beyond the outer edge of the traction wheels, a rotating member journaled in and extending through said hollow spindles to transmit driving power to the mechanism of the implement and a rock shaft journaled in and extending through the rotating member and adapted to raise the implement out of operating position.

4. In a tractor, the combination of a body portion, a power take-off secured to one side of the body portion, a hollow spindle at each side of the body portion wheels on the hollow spindles, a ground engaging implement carried by the body portion and extending laterally beyond the outer edge of the wheels, a transverse rock shaft supported on the body portion and extending through the hollow spindles, means for actuating the rock shaft from the power take-off, a central driving sleeve journaled on the rock shaft intermediate its ends, means for driving said sleeve from the power take-off, an outer driving sleeve journaled on each end of the rock shaft, means for driving the outer sleeves from the central sleeve, driving connections between the sleeves and the driven mechanism of the implement, and connections between the rock shaft and the implement to raise the implement out of operating position.

5. In a tractor, the combination of a body portion, a power take-off secured to one side of the body portion, a hollow spindle at each side of the body portion, wheels on the hollow spindles, a ground engaging implement carried by the body portion and extending laterally beyond the outer edge of the wheels, a housing secured in each spindle and extending laterally beyond the end thereof, a transverse rock shaft supported intermediate its ends on the body portion and at its ends in said housing, means for actuating the rock shaft from the power take-off, a central driving sleeve journaled on the rock shaft intermediate its ends, means for driving said sleeve from the power take-off an outer driving sleeve journaled on each end of the rock shaft, a spur gear secured near each end of the central driving sleeve, a spur gear secured at the inner end of each outer driving sleeve, a countershaft arranged parallel with the driving sleeves and overlapping the adjacent ends thereof, a pair of gears secured on the countershaft and meshing with the gears on the driving sleeves, driving connections between the sleeves and the driven mechanism of the implement, a plurality of arms secured on on the rock shaft, and a flexible connection between each arm and the implement to raise the implement out of operating position.

6. The combination with a tractor comprising a frame, a hollow spindle extending laterally from each side of the frame and traction wheels journaled on said spindles, of an implement associated with the tractor, portions of which are positioned adjacent the outer sides of said wheels, a drive shaft journaled within and extending through said spindles and connected to the portions of the implement adjacent the outer sides of said wheels for transmitting power thereto, and connections through which said shaft is driven from the tractor motor.

7. A tractor comprising a motor, a casing enclosing a transmission, quills extending laterally from each side of said casing and enclosing drive axles, housings extending downwardly and rearwardly from said quills and enclosing driving sprockets, said housings having hollow spindles extending laterally therefrom, traction wheels journaled on said spindles, the openings in said spindles having a common center line passing rearwardly of said casing, said openings thereby providing an unobstructed passage from one side of the tractor to the other.

8. The combination with a tractor comprising a frame, a motor, a sleeve rotatably supported on said frame and extending laterally therefrom, a traction wheel fixed to the outer end of said sleeve, means for rotating said sleeve including a driving connection from said motor and connected with the inner end of the sleeve, of a shaft journaled within said sleeve and extending beyond the ends thereof, its outer end extending beyond the outer plane of said traction wheel, and means connected with the inner end of said shaft for transmitting power from said motor to said shaft.

9. The combination with a tractor comprising a frame, a hollow spindle at one side of the frame, and a traction wheel on the hollow spindle, of an implement carried by the tractor including a draft beam extending longitudinally thereof along the outer side of the traction wheel, a transverse rock shaft journaled in and extending through the hollow spindle, lifting means on said shaft connected with said beam, and means for rocking said shaft to raise the implement out of operating position.

10. The combination with a tractor comprising a frame, a hollow spindle extending laterally from one side of the frame and a traction wheel on said spindle, of an implement associated with the tractor, a portion of which is positioned adjacent the outer side of said wheel, a drive shaft journaled within and extending through said spindle and connected to the portion of the implement adjacent the outer side of said wheel for transmitting power thereto, and a connection through which said shaft is driven from the tractor motor.

11. The combination with a tractor comprising a frame, a hollow spindle at one side of the frame, and a traction wheel on the hollow spindle, of an implement including an operative mechanism and disposed on the outer side of said traction wheel and connected with the tractor for vertical movement with respect thereto, a rock shaft and a rotatable shaft journaled in and extending through the hollow spindle, one of said shafts being tubular and the other of said shafts being disposed within said tubular shaft, lifting means on said rock shaft connected with said implement, means for rocking said shaft to raise the implement out of operating position, power connections between the motor of the tractor and said rotating shaft, and means on the outer end of said rotating shaft connected with the operating mechanism of the implement for operating the latter.

12. The combination with a tractor comprising a frame, a hollow spindle at one side of the frame, and a traction wheel on the hollow spindle, of an implement including a frame comprising a cylindrical member disposed within said hollow spindle and detachably fixed thereto, and operating mechanism connected with said frame on the outer side of said tractor wheel for vertical movement with respect to the tractor, a rock shaft and rotatable shaft journaled in and extending through said cylindrical member, one of said shafts being disposed within said tubular shaft, lifting means on said rock shaft connected with said operating mechanism, means for rocking said shaft to raise the operating mechanism out of operating position, power connections between the motor of the tractor and said rotating shaft, and means on the outer end of said rotating shaft connected with the operating mechanism for operating the latter.

13. The combination with a tractor comprising a frame, a motor, a housing extending downwardly from one side of said frame, a hollow spindle extending laterally from said housing, a sleeve rotatably supported on said spindle, a traction wheel fixed on the sleeve, a portion of the weight of the tractor being transmitted to said wheel through said sleeve, said spindle and said housing, means for rotating said sleeve including a driving connection from said motor and connected with said sleeve, of a shaft journaled within said spindle and extending beyond the outer plane of said traction wheel, and means connected with said shaft for transmitting power from said motor to said shaft.

EDWARD C. BOPF.